United States Patent [19]
Yokomi

[11] Patent Number: 5,435,978
[45] Date of Patent: Jul. 25, 1995

[54] PLATE-TYPE OZONIZER

[75] Inventor: Tetsusuke Yokomi, Hyogo, Japan

[73] Assignee: Sumitomo Precision Products Co., Ltd., Amagasaki, Japan

[21] Appl. No.: 30,300

[22] Filed: Jun. 8, 1993

[30] Foreign Application Priority Data

Aug. 8, 1991 [JP] Japan .................................. 3-224568

[51] Int. Cl.[6] .................................................. B01J 19/08
[52] U.S. Cl. ........................ 422/186.07; 422/186.09; 422/186.11; 422/907
[58] Field of Search .................... 422/186.07, 186.09, 422/186.11, 907

[56] References Cited

U.S. PATENT DOCUMENTS

| | | | |
|---|---|---|---|
| 614,500 | 11/1898 | Ramage | 422/186.07 |
| 811,364 | 1/1806 | Birtman | 422/186.07 |
| 1,149,254 | 8/1915 | Dumars | 422/186.07 |
| 2,118,969 | 5/1938 | Daily | 204/32 |
| 2,128,455 | 8/1938 | Darling | 204/32 |
| 2,309,616 | 1/1943 | Bagby et al. | 204/713 |
| 2,345,798 | 4/1944 | Daily | 204/318 |
| 2,403,241 | 7/1946 | Schaefer | 204/313 |
| 2,404,778 | 7/1946 | Allison | 204/314 |
| 2,561,014 | 7/1951 | Daily | 204/322 |
| 2,744,865 | 5/1956 | Penning | 204/319 |
| 3,309,304 | 3/1967 | Caplan | 156/286 |
| 3,663,418 | 5/1972 | Kawahata | 204/314 |
| 3,899,682 | 8/1975 | Lowther | 250/532 |
| 4,606,892 | 8/1986 | Bachhoffer et al. | 422/186.2 |
| 4,666,679 | 5/1987 | Masuda et al. | 422/186.2 |
| 4,690,803 | 9/1987 | Hirth | 422/186.18 |
| 4,693,870 | 9/1987 | Gloor et al. | 422/186.19 |
| 4,892,713 | 1/1990 | Newman | 422/186.07 |
| 4,908,189 | 3/1990 | Staubach | 422/186.19 |
| 4,986,968 | 1/1991 | Hirth et al. | 422/186.19 |

Primary Examiner—Donald P. Walsh
Assistant Examiner—Daniel Jenkins
Attorney, Agent, or Firm—Oblon, Spivak, McClelland, Maier & Neustadt

[57] ABSTRACT

A plate-type ozonizer capable of suppressing the deformation of plate discharging cells and securing a high ozone-generating efficiency where a high-concentration and high-pressure ozone gas is to be generated. An ozonizer body 10, in which a plurality of discharging cells 11 are stacked one above the other, is housed in a pressure vessel 20. The pressure vessel 20 is supplied with a pressurized gas having a pressure equal to or almost equal to that of the raw material gases which are supplied to said discharging cells 11. Thus there is little or no differential pressure between the inside and the outside of the discharging cells 11 and therefore the discharging cells 11 are not subject to being deformed by unequal inner and outer pressure forces. A dried gas is used as the pressurized gas to prevent also a poor insulation due to a dewing.

2 Claims, 2 Drawing Sheets

PLATE-TYPE OZONIZER

REFERENCE TO RELATED APPLICATION

This application is a continuation of PCT/JP92/00960, filed Jul. 27, 1992, now abandoned.

1. Field of the Invention

The present invention relates to a plate-type ozonizer comprising a plurality of plate discharging cells built up (i.e., stacked one above the other).

2. Background of the Invention

Discharging cells used in a plate-type ozonizer have a construction such that two pieces of electrode 1 are oppositely arranged to form a discharging gap 2 therebetween. Ozonizing raw material gases, such as air and oxygen, are supplied through conduits 23 to said discharging gap 2, as shown in FIG. 2. Each electrode 1 comprises a metallic plate and a dielectric coated on a surface of said metallic plate. The a thickness of said dielectric is held to about 1.0 mm so that it may not become a resistance for heat transfer. And, a plurality of said discharging cells are built up by putting a cooling member called a heat sink therebetween to form said plate-type ozonizer having an appointed capacity. Reference numeral 3 designates a picture frame-shaped packing for forming the discharging gap 2 between the electrodes 1 and reference numeral 4 designates an insulating separator.

With such the plate-type ozonizer, the discharging gaps 2 of the discharging cells can be uniformly kept narrow, so that discharging can be achieved at a low voltage. In addition, the electrodes 1 can be easily large-sized avid cooled. Accordingly, the plate-type ozonizer having the above described construction is more suitable for generation of high-concentration ozone as compared with tube-type ozonizers and the like.

However, even if it is intended to generate a high-concentration and high-pressure ozone gas by such the plate-type ozonizer, a problem occurs in that ozone-generating efficiency is reduced.

That is to say, in order to generate said high-concentration and high-pressure ozone gas by the plate-type ozonizer, a considerable electrode area and a pressure of said raw material gases corresponding to the pressure required for the ozone gas are necessary. However, the thin electrodes 1 are apt to be deformed when large-sized and, if the internal pressure of the discharging gap 2 is increased under such condition, a large strain is produced. As the result, the uniformity of the discharging gap cannot be kept and thus the ozone-generating efficiency is reduced.

It is thought that an enhancement of support member for the electrodes 1 is effective for solving this problem. However, this countermeasure leads to not only a large-sizing of support member but also applying a large tightening force to said packing 3 of tile discharging cell 3 which cause a reduction in the reliability of the packing 3. Accordingly, it is not preferable to suppress a deformation of the electrodes 1 by mechanical reinforcement. Thus actually a reduction of said ozone-generating efficiency due to said deformation of the electrodes 1 is inevitable.

Furthermore, in order to generate the high-concentration ozone gas used in an apparatus for producing semiconductors, it is necessary to strongly cool the cooler with a liquid. However, if the temperature of the cooler is extremely reduced, dew condenser on it. Since high voltage is applied to the discharging cell, the causes poor insulation.

It is an object of the present invention to provide a plate-type ozonizer having large-sized discharging cells which is capable of surely preventing the discharging cells from being deformed without reinforcing them even in tile case where the internal pressure of the discharging cells is high.

It is another object of the present invention to provide a plate-type ozonizer having no possibility of dew collecting thereon even in the case where the discharging cells are strongly cooled.

DISCLOSURE OF THE INVENTION

A plate-type ozonizer according to the present invention is provided with an ozonizer body, in which plate discharging cells are built up and raw material gases are circulated in the respective discharging cells to generate ozone. The invention includes a pressure vessel for housing said ozonizer body therein and means for supplying the inside of said pressure vessel with a pressurized gas having almost the same pressure as that of said raw material gases supplied to insides of the respective discharging cells of the ozonizer body.

Since a differential pressure between the inside and the outside of the discharging cell in the ozonizer body is reduced, the deformation of the discharging cells can be suppressed even though the internal pressure of the discharging cells is heightened in the case where the discharging cells are large-sized and thus apt to be deformed. It is desired to use a dry gas having a dew point lower than that of the coolant used for the discharging cells as the pressurized gas to be supplied to the inside of the pressure vessel.

In the plate-type ozonizer according to the present invention, the deformation of the discharging cells can be suppressed by reducing the differential pressure between the inside and the outside of the discharging cell. Thus a uniformity of discharging gaps can be kept in the above described manner, so that the ozone-generating efficiency is not reduced even though the discharging cells are large-sized or supplied with high-pressure raw material gases. Accordingly, a high-concentration and high-pressure ozone gas can be generated with high efficiency.

Besides, mechanical means, such as reinforcement, are not adapted for suppressing tile deformation of the discharging cells. Accordingly not only can a large-sizing of support members be avoided, but also the tightening force for the discharging cells is not increased. Thus an unreasonable force for securing the discharging gaps is not applied to the gaskets thereby resulting in improved durability and reliability of the gaskets.

If dry gas is used as the pressurized gas, a reduction of insulation due to the formation of dew can be prevented and thus the cooling capacity can be improved and the concentration of the ozone gas can be incraesed.

SIMPLE DESCRIPTION OF THE DRAWINGS

FIG. 1 is a side view schematically showing one preferred embodiment of a plate-type ozonizer to which the present invention was applied; and FIG. 2 is the sectional view showing a construction of discharging cells.

DESCRIPTION OF THE PREFERRED EMBODIMENTS

Figure 1:
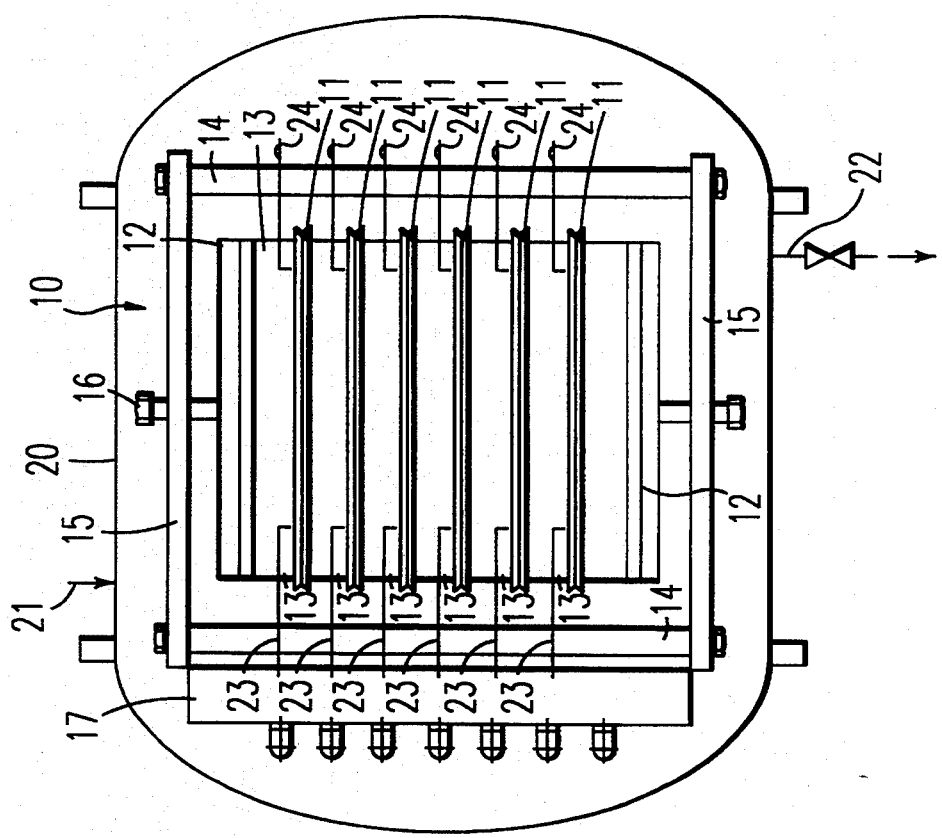

The preferred embodiments of the present invention will be below described with reference to the drawings.

A plate-type ozonizer according to the present invention is provided with an ozonizer body 10 comprising a plurality of plate discharging cells 11 and a pressure vessel 20 for housing said ozonizer body 10 therein.

In the ozonizer body 10, a plurality of said discharging cells 11 are built up under the condition that a cooler 13 is put between two pieces of support plate 12 to be supported by holding them by means of bolts 16 between two pieces of end plate 15 connected with each other by means of a rod 14.

Figure 2:
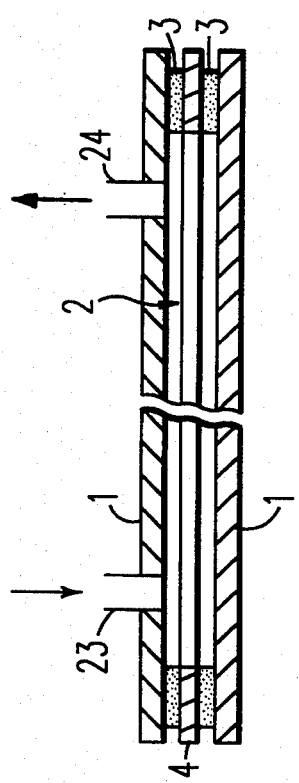

The respective discharging cells 11 are liquid-cooled together with both electrodes 1 (refer to FIG. 2) by means of the coolers 13. Pure water or an insulating oil is circulated through the cooler 13 in order to electrically insulate both electrodes 1. Raw material gases are supplied to a gap between both electrodes 1 in the respective discharging cells 11 through a manifold 17 and conduits 23 at an appointed pressure.

Said pressure vessel 20 supports the ozonizer body 10 therein by means of support members (not shown). The inside of the pressure vessel 20 is supplied with a pressurized gas through an upper inlet pipe 21. Said pressurized gas within the pressure vessel 20 is held at the same pressure as the internal pressure of the respective discharging cells 11 and discharged little by little through a lower outlet pipe 22. Said raw material gases are sent to said manifold 17 through an exclusive gas pipe so as not to be mixed with the pressurized gas within the pressure vessel 20. Also the ozone gas discharged from the respective discharging cells 11 is introduced out of the pressure vessel 20 through conduits 24 and said exclusive gas pipe similarly.

It is desired that the pressurized gas be dried to a degree such that dew does not form on a surface of the cooler 13. Inexpensive instrumentation air is used as the pressurized gas. In addition, also $SF_6$, $N_2$ and the like having a high electrical insulation are desirably used as the pressurized gas.

Air, oxygen and the like are used as the raw material gases but oxygen is required in order to increase a concentration of ozone to be generated.

In the plate-type ozonizer according to the present invention, a pressure within the discharging cell 11, that is the pressure between both electrodes 1, is made equal to the pressure within the pressure vessel 20 so as not to produce a differential pressure between the inside and the outside of the discharging cell. Neither of the electrodes 1 of the discharging cell 11 is deformed and thus a uniformity of the discharging gap is kept even in the case where the discharging cell 11 is large-sized and the inside of the discharging cell 11 is supplied with high-pressure raw material gases. Accordingly, a high-concentration and high-pressure ozone gas can be efficiently generated.

In addition, since said uniformity of said discharging gap is kept, the discharging gap can be reduced, thereby increasing said concentration of ozone. A relation between the discharging gap and the resulting concentration of ozone is shown in Table 1. The uniformity of the discharging gap can be kept even though its width is about 0.5 mm.

TABLE 1

| Discharging gap | Resulting concentration of ozone |
| --- | --- |
| 0.9 mm | 180 mg/l |
| 0.6 mm | 230 mg/l |
| 0.5 mm | 250 mg/l |

One piece of electrode in the discharging cell has an area of 300 to 2,000 $cm^2$.

Since the pressurized gas within the pressure vessel 20 is discharged little by little, in the case where the raw material gases and/or the ozone gas are leaked out of the ozonizer body 10, the leaked gases are mixed with the pressurized gas to be discharged out of the pressure vessel 20. Accordingly, a leakage of the raw material gases can be automatically detected by an instrumental analysis of an exhaust gas. Although also the raw material gases (oxygen, superdried air and the like) can be used as the pressurized gas, it becomes difficult to detect said leakage of the raw material gases from the ozonizer body 10 in that case.

The results in the case where tile ozone gas was actually generated by the use of the plate-type ozonizer according to the present invention are shown in Table 2. In the case where the inside of the pressure vessel 20 is not pressurized, the concentration of ozone generated amounts to 122 $g-O_3/Nm^3$, while, in the case where a pressure corresponding to that of the raw material gases is applied to the inside of the pressure vessel 20, the concentration of ozone generated amounts to 132 $g-O_3/Nm^3$, that is, rises by 8% or more. Since there is no change in conditions excepting the pressurizing, it seems that this improvement of ozone-generating efficiecy results from an impropvement of the discharging gaps in uniformity due to the pressurizing. In addition, 6 pieces of discharging cell were used and the surface area of the electrodes of 1,800 $cm^2$ was selected.

TABLE 2

|  | Present invention | Comparative example |
| --- | --- | --- |
| Raw material gases | Oxygen | Oxygen |
| Pressure of raw material gases | 1.0 $kgf/cm^2$ | 1.0 $kgf/cm^2$ |
| Pressurized gas | Instrumental air | — |
| Dew point of pressurized gas | −5° C. | — |
| Temperature of coolant | 15° C. | 15° C. |
| Concentration of ozone generated | 132 $g-O_3/Nm^3$ | 122 $g-O_3/Nm^3$ |

The ozone-generating efficiency is expressed by a quantity of ozone generated/a quantity of electric power used. The conventional improvement of efficiency had been made mainly with respect of reducing the total energy required for the generation of ozone by reducing the electric energy required for the generation of ozone. However, the resulting improvement amounted to merely at most about 10 to 15% for the last 10 to 15 years. According to the present invention, this ozone-generating efficiency can be improved by 5 to 10% at a single stroke. That is to say, a very great effect can be achieved.

Industrial Availability

Since the plate-type ozonizer according to the present invention can efficiently generate high-concentration and high-pressure ozone gas, it can be used in-the TEOS-CVD apparatus which requires high-concentration and high-pressure ozone for producing semiconductors. In addition, it can be suitably used also in the field of bleaching pulps which requires high-concentration and large-volume of ozone and a reduced quantity of electric power consumed.

What is claimed is:

1. A plate-type ozonizer, comprising:
   (a) an ozonizer body including a plurality of plate discharging cells arranged one above the other, each of said plate discharging cells including a pair of plate electrodes;
   (b) means for circulating first pressurized raw material gases in and through the respective plate discharging cells to generate ozone;
   (c) a pressure vessel for housing said ozonizer body therein;
   (d) means for supplying a second pressurized gas within said pressure vessel and outside of said plate discharging cells;
   (e) whereby deformation of said plate electrodes is limited by maintaining the pressure of said second pressurized gas within said pressure vessel at a level almost equal to the pressure of said first raw material gases within the respective plate discharging cells.

2. A plate-type ozonizer as set forth in claim 1, wherein a dried gas having a dew point lower than a temperature of a coolant for cooling the discharging cells is used as said pressurized gas.

* * * * *